(12) United States Patent
Lin et al.

(10) Patent No.: US 11,748,895 B2
(45) Date of Patent: Sep. 5, 2023

(54) METHOD AND APPARATUS FOR PROCESSING VIDEO FRAME

(71) Applicant: Beijing Baidu Netcom Science and Technology Co., Ltd., Beijing (CN)

(72) Inventors: Tianwei Lin, Beijing (CN); Xin Li, Beijing (CN); Fu Li, Beijing (CN); Dongliang He, Beijing (CN); Hao Sun, Beijing (CN); Henan Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 278 days.

(21) Appl. No.: 17/184,379

(22) Filed: Feb. 24, 2021

(65) Prior Publication Data

US 2021/0334579 A1   Oct. 28, 2021

(30) Foreign Application Priority Data

Apr. 22, 2020   (CN) .......................... 202010320935.3

(51) Int. Cl.
*G06K 9/00* (2022.01)
*G06T 7/246* (2017.01)
(Continued)

(52) U.S. Cl.
CPC ............ *G06T 7/246* (2017.01); *G06F 18/253* (2023.01); *G06N 3/04* (2013.01); *G06V 20/41* (2022.01); *G06V 20/46* (2022.01)

(58) Field of Classification Search
CPC ........... G06T 7/246; G06T 2207/20081; G06T 2207/20084; G06T 2207/20182;
(Continued)

(56) References Cited

U.S. PATENT DOCUMENTS 10,984,245 B1 *   4/2021   Tran ..................... G06F 18/2111
11,354,906 B2 *   6/2022   Perazzi .................... G06F 17/15
(Continued)

FOREIGN PATENT DOCUMENTS

CN   109086807 A   12/2018
CN   109978756 A   7/2019
(Continued)

OTHER PUBLICATIONS

Chen, Dongdong, et al., "Coherent Online Video Style Transfer," ARXIV.org, Cornell University Library, 201 Olin Library, Cornell University, Ithaca, NY 14853, pp. 1-10 (Mar. 27, 2017).
(Continued)

*Primary Examiner* — Dhaval V Patel
(74) *Attorney, Agent, or Firm* — Kilpatrick Townsend & Stockton LLP (57) ABSTRACT

A method and apparatus for processing a video frame are provided. The method may include: converting, using an optical flow generated based on a previous frame and a next frame of adjacent frames in a video, a feature map of the previous frame to obtain a converted feature map; determining, based on an error of the optical flow, a weight of the converted feature map, and obtaining a fused feature map based on a weighted result of a feature of the converted feature map and a feature of a feature map of the next frame; and updating the feature map of the next frame as the fused feature map.

13 Claims, 5 Drawing Sheets (51) Int. Cl.
*G06N 3/04* (2023.01)
*G06V 20/40* (2022.01)
*G06F 18/25* (2023.01)

(58) Field of Classification Search
CPC . G06T 2207/20216; G06T 2207/20221; G06T 2207/30168; G06T 7/269; G06T 2207/10016; G06F 18/253; G06N 3/04; G06V 20/41; G06V 20/46; H04N 21/23418; H04N 21/44008
See application file for complete search history.

(56) References Cited

U.S. PATENT DOCUMENTS

| | | |
|---|---|---|
| 2018/0189570 A1 | 7/2018 | Paluri et al. |
| 2019/0333198 A1 | 10/2019 | Wang et al. |
| 2020/0219269 A1* | 7/2020 | Zhang ................ G06V 40/103 |
| 2020/0285911 A1* | 9/2020 | Guo ...................... G06N 3/045 |
| 2021/0314474 A1* | 10/2021 | Yang .................... H04N 19/42 |

FOREIGN PATENT DOCUMENTS

| | | |
|---|---|---|
| CN | 110555799 A | 12/2019 |
| JP | 2002-374521 A | 12/2002 |
| JP | 2020-038669 A | 3/2020 |

OTHER PUBLICATIONS

European Search Report dated Jul. 29, 2021 in related European Patent Application No. 21159302.5 (six pages).

\* cited by examiner

METHOD AND APPARATUS FOR PROCESSING VIDEO FRAME

CROSS-REFERENCE TO RELATED APPLICATIONS

This application claims priority to Chinese Application No. 202010320935.3, filed on Apr. 22, 2020 and entitled "Method and Apparatus for Processing Video Frame," the content of which is hereby incorporated by reference in its entirety.

TECHNICAL FIELD

Embodiments of the present disclosure relate to the field of computer technology, specifically to the field of computer vision technology, and more specifically to a method and apparatus for processing a video frame.

BACKGROUND

With the development of Internet technology, various Internet platforms have gradually emerged, such as video websites and live broadcast platforms. In order to enrich presentation forms of a video picture, various processing may be performed on the video picture, such as adding a special effect, and converting a style.

Consecutive video frames in a video are often the difficulty in image processing. The processing result of each video frame may have an error, and if the error is large, then the processing result of the consecutive video frames may have a jitter problem.

SUMMARY

Embodiments of the present disclosure provide a method, apparatus, electronic device, and storage medium for processing a video frame.

In a first aspect, an embodiment of the present disclosure provides a method for processing a video frame, the method including: converting, using an optical flow generated based on a previous frame and a next frame of adjacent frames in a video, a feature map of the previous frame to obtain a converted feature map; determining, based on an error of the optical flow, a weight of the converted feature map, and obtaining a fused feature map based on a weighted result of a feature of the converted feature map and a feature of a feature map of the next frame; and updating the feature map of the next frame, the updated feature map being the fused feature map.

In a second aspect, an embodiment of the present disclosure provides an apparatus for processing a video frame, the apparatus including: a converting unit configured to convert, using an optical flow generated based on a previous frame and a next frame of adjacent frames in a video, a feature map of the previous frame to obtain a converted feature map; a fusing unit configured to determine, based on an error of the optical flow, a weight of the converted feature map, and obtain a fused feature map based on a weighted result of a feature of the converted feature map and a feature of a feature map of the next frame; and an updating unit configured to update the feature map of the next frame, the updated feature map being the fused feature map.

In a third aspect, an embodiment of the present disclosure provides an electronic device, the device electronic including: one or more processors; and a storage apparatus for storing one or more programs, where the one or more programs, when executed by the one or more processors, cause the one or more processors to implement any embodiment of the method for processing a video frame.

In a fourth aspect, an embodiment of the present disclosure provides a computer readable storage medium, storing a computer program thereon, where the computer program, when executed by a processor, implements any embodiment of the method for processing a video frame.

BRIEF DESCRIPTION OF THE DRAWINGS

After reading detailed description of non-limiting embodiments with reference to the following accompanying drawings, other features, objectives, and advantages of embodiments of the present disclosure will become more apparent.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

It should also be noted that some embodiments in the present disclosure and some features in the disclosure may be combined with each other on a non-conflict basis. Features of the present disclosure will be described below in detail with reference to the accompanying drawings and in combination with embodiments.

According to solutions of embodiments of the present disclosure, a positional deviation of objects between adjacent video frames is neutralized using the optical flow conversion result of the previous frame, thereby effectively avoiding picture jitter between the adjacent video frames after image processing. Further, the determining the weight of the converted feature map based on the error of the optical flow helps to avoid the problem of inaccuracy of fused features caused by the error of the optical flow.

Figure 1:
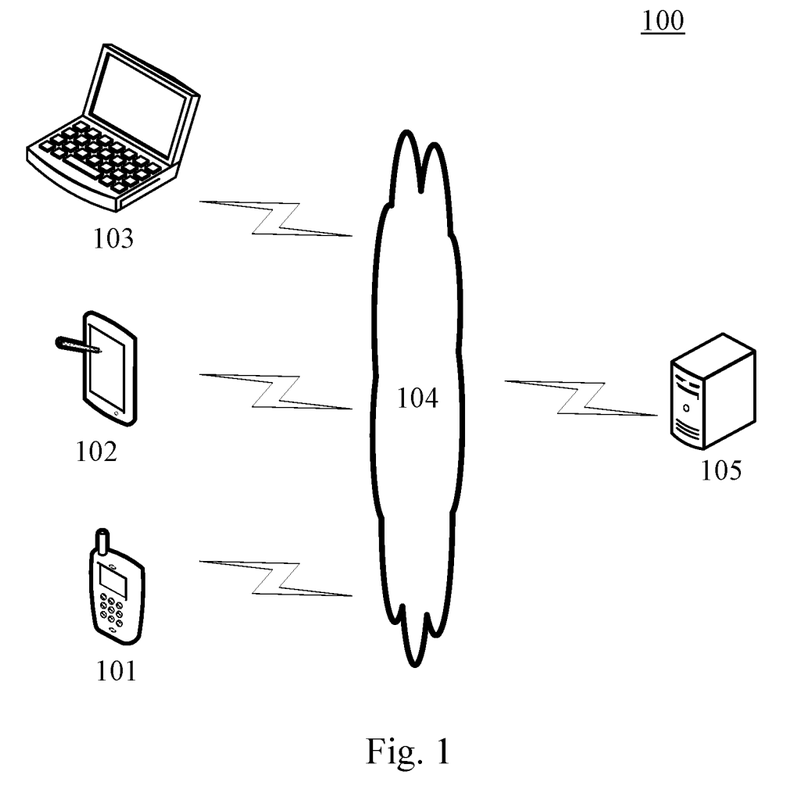
FIG. 1 is a diagram of an example system architecture in which some embodiments of the present disclosure may be implemented.

FIG. 1 shows an example system architecture 100 in which a method for processing a video frame or an apparatus for processing a video frame of embodiments of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical fiber cables.

A user may interact with the server 105 using the terminal devices 101, 102, and 103 via the network 104, e.g., to receive or send a message. The terminal devices 101, 102, and 103 may be provided with various communication client applications, such as a video application, a live broadcast application, an instant messaging tool, an email client, and social platform software.

The terminal devices 101, 102, and 103 here may be hardware, or may be software. When the terminal devices 101, 102, and 103 are hardware, the terminal devices may be various electronic devices with a display screen, including but not limited to a smart phone, a tablet computer, an e-book reader, a laptop portable computer, a desktop computer, or the like. When the terminal devices 101, 102, and 103 are software, the terminal devices may be installed in the above-listed electronic devices, may be implemented as a plurality of software programs or software modules (e.g., a plurality of software programs or software modules configured to provide distributed services), or may be implemented as a single software program or software module. This is not specifically limited here.

The server 105 may be a server providing various services, such as a backend server providing support for the terminal devices 101, 102, and 103. The backend server can process, e.g., analyze, data, such as received adjacent video frames, and return the processing result (e.g., an updated feature map) to the terminal devices.

It should be noted that the method for processing a video frame provided in embodiments of the present disclosure may be executed by the server 105 or the terminal devices 101, 102, and 103. Accordingly, the apparatus for processing a video frame may be provided in the server 105 or the terminal devices 101, 102, and 103.

It should be understood that the numbers of terminal devices, networks, and servers in FIG. 1 are merely illustrative. Any number of terminal devices, networks, and servers may be provided based on actual requirements.

Figure 2:
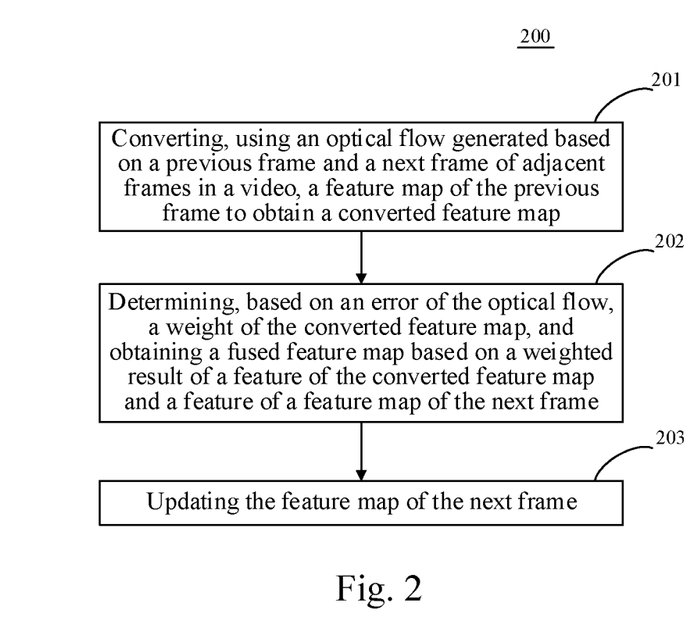
FIG. 2 is a flowchart of a method for processing a video frame according to an embodiment of the present disclosure.

Further referring to FIG. 2, a process 200 of a method for processing a video frame according to an embodiment of the present disclosure is shown. The method for processing a video frame includes the following steps.

Step 201: converting, using an optical flow generated based on a previous frame and a next frame of adjacent frames in a video, a feature map of the previous frame to obtain a converted feature map.

In the present embodiment, an executing body (e.g., the server or the terminal device shown in FIG. 1) on which the method for processing a video frame is performed may convert the acquired feature map of the previous frame to obtain the converted feature map using the optical flow generated based on the previous frame (a frame of previous time, e.g., a 5th frame) and the next frame (a frame of next time, e.g., a 6th frame) of the adjacent frames in the video. The converted feature map is similar (a similarity more than a preset threshold) to the feature map of the next frame. In practice, the converting process may also be referred to as a warp process, i.e., causing a position offset of each pixel, and the offset amount of the offset is the determined optical flow.

In practice, the executing body may acquire the feature map of the previous frame and the feature map of the next frame among the two adjacent video frames of the video. Specifically, the executing body may directly acquire the feature map of the next frame and the feature map of the previous frame locally or from other electronic devices. In addition, the executing body may acquire the next frame and the previous frame, and detect the next frame and the previous frame, to acquire the feature map of the next frame and the feature map of the previous frame. In practice, the optical flow may be a dense optical flow or a sparse optical flow.

Specifically, the optical flow may be obtained by various approaches. For example, the executing body may directly acquire the optical flow locally or from other electronic devices. Alternatively, the executing body may acquire the previous frame and the next frame, and generate the optical flow. For example, the executing body may generate an initial optical flow between the previous frame and the next frame, and perform preset processing on the initial optical flow, thereby obtaining the optical flow.

Step 202: determining, based on an error of the optical flow, a weight of the converted feature map, and obtaining a fused feature map based on a weighted result of a feature of the converted feature map and a feature of a feature map of the next frame.

In the present embodiment, the executing body may determine the weight of the converted feature map, acquire the weighted result of weighting the converted feature map and the feature map of the next frame, and obtain the fused feature map based on the weighted result.

The error of the optical flow refers to a deviation between the generated optical flow and the real optical flow. The executing body may convert the contracted previous frame using the optical flow, and compare the conversion result with the contracted next frame, e.g., computing a difference between the conversion result and the contracted next frame or an absolute value of the difference, thereby determining the error of the optical flow.

In practice, the executing body may determine the weight of the converted feature map by various approaches based on the error of the optical flow. For example, in response to the error of the optical flow being small (less than a specified error threshold), the executing body may determine that the weight of the converted feature map is a specified weight value, e.g., a largest candidate weight among candidate weights of the converted feature map. Alternatively, the executing body may acquire a corresponding relationship (such as a model or a corresponding relationship table) between the error of the optical flow and the weight of the converted feature map, thereby obtaining the weight of the converted feature map corresponding to the determined error of the optical flow.

In practice, the executing body may obtain the fused feature map by various approaches based on the weighted result. For example, the executing body may determine a weighted average of features of the feature maps based on the weighted result, and use the weighted average as the fused feature map. Alternatively, the executing body may directly use the weighted result as the fused feature map, or perform preset processing on the weighted result, e.g., multiplying the weighted result by a specified coefficient. Here, a sum of weights of the feature maps involved in the weighting may be 1.

Step 203: updating the feature map of the next frame, the updated feature map being the fused feature map.

In the present embodiment, the executing body may update the feature map of the next frame to the fused feature map. In practice, the executing body may also use the fused feature map as the feature map of the next frame for subsequent image processing, such as inputting the fused feature map into a deep neural network. For example, the executing body may input the fused feature map into a fully connected layer of a convolutional neural network, or may input the fused feature map into a generator of a generative adversarial network.

The method provided in embodiments of the present disclosure neutralizes a positional deviation of objects between adjacent frames using the optical flow conversion result of the previous frame, to avoid picture jitter between the adjacent frames after image processing. Further, the determining the weight of the converted feature map based on the error of the optical flow helps to avoid the problem of inaccuracy of fused features caused by the error of the optical flow.

In some alternative implementations of the present embodiment, the method may further include: weighting the feature of the converted feature map and the feature of the feature map of the next frame based on the weight of the converted feature map and a weight of the feature map of the next frame, to obtain the weighted result of the feature of the converted feature map and the feature of the feature map of the next frame, where the higher the weight of the converted feature map is, the lower the weight of the feature map of the next frame is.

In these alternative implementations, the method may further include: the executing body may weigh the converted feature map and the feature map of the next frame. Specifically, the weight of the converted feature map and the weight of the feature map of the next frame may be mutually restricted.

Alternatively, a sum of the weight of the converted feature map and the weight of the feature map of the next frame may be a preset value. Specifically, the sum of the weights of the feature maps involved in the weighting may be the preset value, e.g., may be 1. For example, the weight of the feature map of the next frame may be the preset value minus the weight of the converted feature map. For example, the preset value is 1. If the weight of the converted feature map is 1, then the weight of the feature map of the next frame is 0. In practice, the weight may only include two values: 1 and 0.

These implementations can acquire a more accurate fused feature map by limiting a relationship between the weights.

In some alternative implementations of the present embodiment, step 201 may include: generating the feature map of the next frame and the feature map of the previous frame of the video using a generative adversarial network; and the method further includes: processing the updated feature map using the generative adversarial network, to generate an image of a target domain corresponding to the next frame.

In these alternative implementations, the executing body may generate the feature map of the next frame and the feature map of the previous frame using the generative adversarial network. In addition, the executing body may further process the updated feature map using the generative adversarial network after updating the feature map of the next frame to the fused feature map, thereby generating the image of the target domain. The generative adversarial network here can be used to generate the image of the target domain.

These implementations can avoid the jitter of objects in consecutive video frames processed by the generative adversarial network, thereby remedying the problem of picture jitter caused by the difference between the processing results of adjacent frames caused by the inability of the generative adversarial network to perform batch processing on a plurality of video frames, and improving the stability of the video picture.

Figure 3:
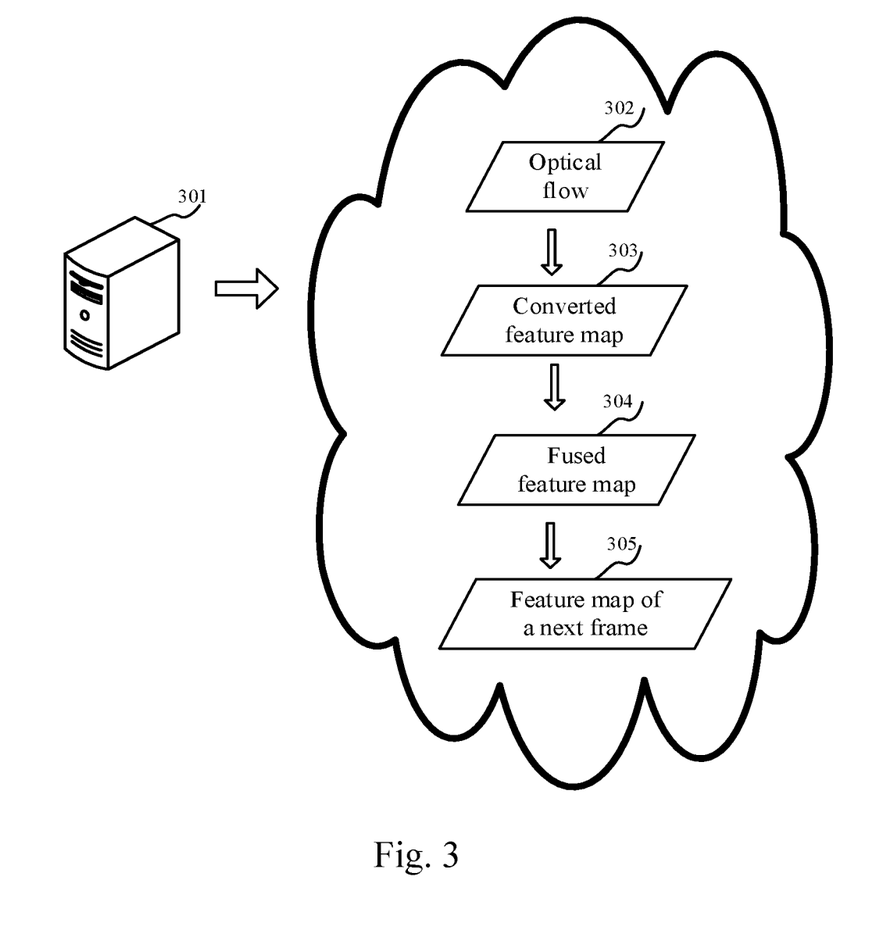
FIG. 3 is a schematic diagram of an application scenario of the method for processing a video frame according to an embodiment of the present disclosure.

Further referring to FIG. 3, FIG. 3 is a schematic diagram of an application scenario of the method for processing a video frame according to the present embodiment. In the application scenario of FIG. 3, an executing body 301 converts, using an optical flow 302 generated based on a previous frame (e.g., a 7th frame) and a next frame (e.g., an 8th frame) of adjacent frames in a video, to obtain a converted feature map 303, where a size of the feature map is a target size 32×32. The executing body 301 determines, based on an error of the optical flow 302, a weight of the converted feature map 303, and obtains a fused feature map 304 based on a weighted result of a feature of the converted feature map 303 and a feature of a feature map of the next frame. The executing body 301 updates the feature map 305 of the next frame, the updated feature map being the fused feature map 304.

In some alternative implementations of the present embodiment, the optical flow may be a dense optical flow. The method for processing a video frame according to an embodiment of the present disclosure may further include: contracting the previous frame to a size of the feature map of the previous frame, contracting the next frame to a size of the feature map of the next frame, determining a dense optical flow between the contracted previous frame and the contracted next frame, and using the dense optical flow as the optical flow generated based on the previous frame and the next frame of the adjacent frames in the video.

In these alternative implementations, the executing body (e.g., the server or the terminal device shown in FIG. 1) of the method for processing a video frame can reduce a size of the previous frame to the size of the feature map of the previous frame, and reduce a size of the next frame to the size of the feature map of the next frame. Specifically, the size of the acquired feature map of the next frame is consistent with the size of the acquired feature map of the previous frame. Then, the executing body may determine the optical flow between the contracted previous frame and the converted next frame. Here, both the size of the feature map of the previous frame and the size of the converted feature map are a size of the above contracted video frame. For example, the previous frame and the next frame are a 9th frame and a 10th frame of the video, respectively, and the executing body may contract the 9th frame and the 10th frame to 32×32, i.e., the size of the feature map.

These implementations can perform feature fusion using the dense optical flow pixel by pixel, thereby improving the accuracy of the fused feature map.

Figure 4:
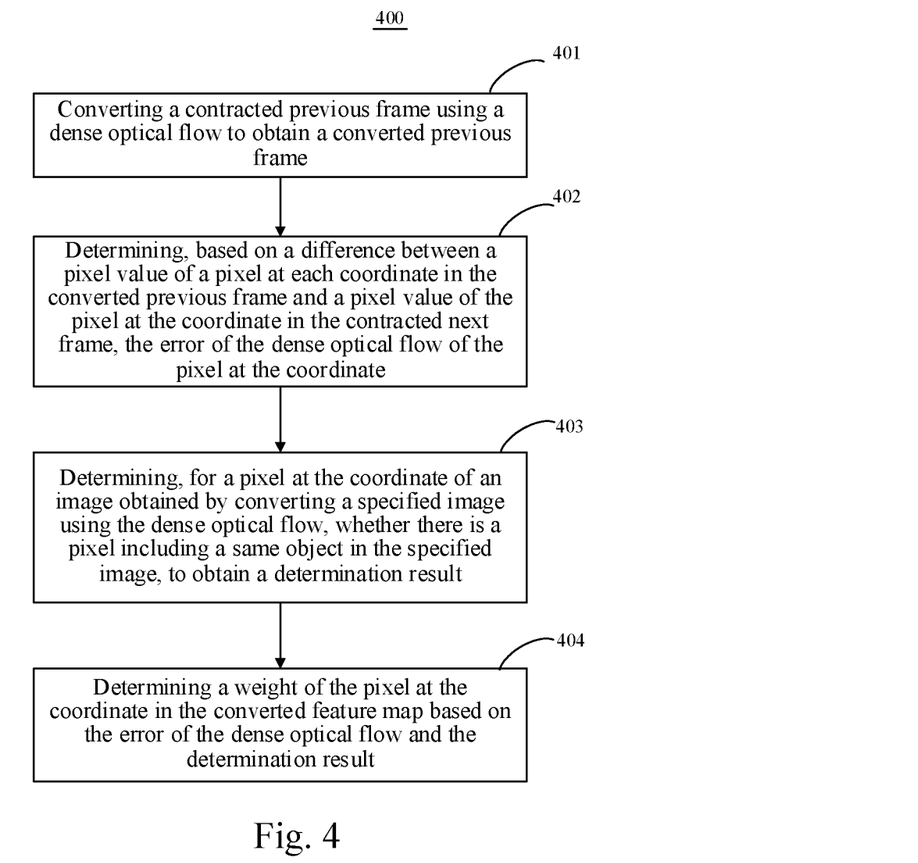
FIG. 4 is a flowchart of determining a weight of a converted feature map of the method for processing a video frame according to an embodiment of the present disclosure.

Further referring to FIG. 4, a process 400 of determining a weight of a converted feature map of the method for processing a video frame according to an embodiment is shown. The process 400 includes the following steps.

Step 401: converting a contracted previous frame using a dense optical flow to obtain a converted previous frame.

In the present embodiment, the optical flow is a dense optical flow. An executing body (e.g., the server or the terminal device shown in FIG. 1) on which the method for processing a video frame is performed may convert the contracted previous frame using the dense optical flow, and use the conversion result as the converted previous frame.

The converted previous frame is similar to the contracted next frame. The dense optical flow is also a compact optical flow. The dense optical flow can determine a positional deviation between the contracted next frame and the contracted previous frame pixel by pixel.

Step 402: determining, based on a difference between a pixel value of a pixel at each coordinate in the converted previous frame and a pixel value of the pixel at the coordinate in the contracted next frame, the error of the dense optical flow of the pixel at the coordinate.

In the present embodiment, the executing body may determine the dense optical flow pixel by pixel. For each pixel, the error of the dense optical flow of the pixel at the coordinate is determined based on the difference between the pixel value of the pixel at the coordinate in the converted previous frame and the pixel value of the pixel at the coordinate in the contracted next frame.

In practice, the executing body may determine the error of the dense optical flow by various approaches based on the difference. For example, the executing body may determine an absolute value of the difference as the error of the dense optical flow, or may directly determine the difference as the error of the dense optical flow. In addition, the executing body may further perform preset processing on the difference, e.g., multiplying the difference by a preset coefficient or inputting the difference into a preset function, and use the result as the error of the dense optical flow.

Step 403: determining, for a pixel at the coordinate of an image obtained by converting a specified image using the dense optical flow, whether there is a pixel including a same object in the specified image as the pixel at the coordinate of the image obtained by converting the specified image, to obtain a determination result, where a size of the specified image is a target size.

In the present embodiment, the executing body may determine whether the pixel at the coordinate in the image converted using the dense optical flow and the pixel at the coordinate in the image before the conversion include the same object. That is, in the previous frame and the next frame of the adjacent frames in the video, a position of the object may change, and some contents in the next frame are new contents that do not appear in the previous frame. This step can be used to find a same content in adjacent frames. In practice, the specified image here may be a variety of images, e.g., may be the contracted previous frame.

In some alternative implementations of the present embodiment, step 403 may include: acquiring the specified image with a pixel value of each pixel being a preset pixel value; converting the specified image using the dense optical flow to obtain a converted specified image; determining, for the pixel at each coordinate in the converted specified image, whether a pixel value of the pixel at the coordinate in the converted specified image is greater than or equal to the preset pixel value; determining, in response to the pixel value of the pixel at the coordinate in the converted specified image being greater than or equal to the preset pixel value, the determination result being that there is the pixel including the same object in the specified image; and determining, in response to the pixel value of the pixel at the coordinate in the converted specified image being less than the preset pixel value, the determination result being that there is no pixel including the same object in the specified image.

In these alternative implementations, the executing body acquires the specified image, and the pixel values of all pixels in the specified image may be the preset pixel value, e.g., 1 or 2. The executing body may convert the specified image using the dense optical flow to obtain the converted specified image. Thus, relative to an object in the specified image, the object in the converted specified image may have a position offset. If a pixel at a coordinate in the converted specified image has a pixel value greater than or equal to the preset pixel value, then a content of the pixel, i.e., the object, not only exists in the converted specified image, but also exists in the specified image. If the pixel at the coordinate in the converted specified image has a pixel value less than the preset pixel value, then the content of the pixel, i.e., the object, only exists in the converted specified image, and does not exist in the specified image.

These implementations can acquire the determination result using a specified image with all pixel values being a certain value, thereby simplifying the computing process and improving the processing efficiency of the solution.

Step 404: determining a weight of the pixel at the coordinate in the converted feature map based on the error of the dense optical flow and the determination result.

In the present embodiment, the executing body may determine the weight of the pixel at the coordinate in the converted feature map based on the error of the dense optical flow and the determination result. In practice, the executing body may determine the weight by various approaches based on the error and the determination result. For example, the executing body may acquire a corresponding relationship (e.g., a corresponding relationship table or model) between the error, the determination result, and the weight, thereby obtaining the weight corresponding to the error and the determination result.

In the present embodiment, the dense optical flow can be used to perform feature fusion pixel by pixel, thereby improving the effect of preventing picture jitter. Further, in the present embodiment, the weight of the converted feature map of the previous frame can be determined based on both the error of the dense optical flow and the determination result, thereby improving the accuracy of the fused feature map.

In some alternative implementations of the present embodiment, step 404 may include: determining, in response to determining that the error of the dense optical flow is less than a specified error threshold, and the determination result is that there is the pixel including the same object in the specified image, that the weight of the pixel at the coordinate in the converted feature map is a first candidate weight, where the greater the pixel value of the pixel at the coordinate in the contracted next frame is, the higher the specified error threshold is; and determining, in response to determining that the error of the dense optical flow is more than or equal to the specified error threshold, and/or the determination result is that there is no pixel including the same object in the specified image, that the weight of the pixel at the coordinate in the converted feature map is a second candidate weight, where the first candidate weight is higher than the second candidate weight.

In these alternative implementations, the weight of the pixel at the coordinate in the converted feature map can be determined as the first candidate weight only in the case where the error of the dense optical flow is less than the specified error threshold and the determination result is that there is the pixel including the same object in the specified image. Here, a value of the first candidate weight is relatively high, e.g., may be 1, while a value of the second candidate weight is relatively low, e.g., may be 0.

In practice, the specified error threshold may be associated with the pixel value at the coordinate in the contracted next frame. The greater the pixel value is, the higher the specified error threshold is. For example, the pixel value of the pixel at the coordinate point in the contracted next frame is set as A, and the specified error threshold may be a×A+b, where "a" is a preset coefficient of A, and may range from 0 to 1, while "b" is a preset constant, and may be more than 0.

In these implementations, the processing result of the converted previous frame can be further used only in the case where the error of the dense optical flow is small and the content of the pixel exists in both the previous frame and the next frame, thereby avoiding the positional deviation of features in the fused feature map caused by a very large error of the optical flow, preventing picture error caused by replacing a new content in the next frame by the content in the previous frame during the fusion, and guaranteeing the accuracy of the content in the picture.

Figure 5:
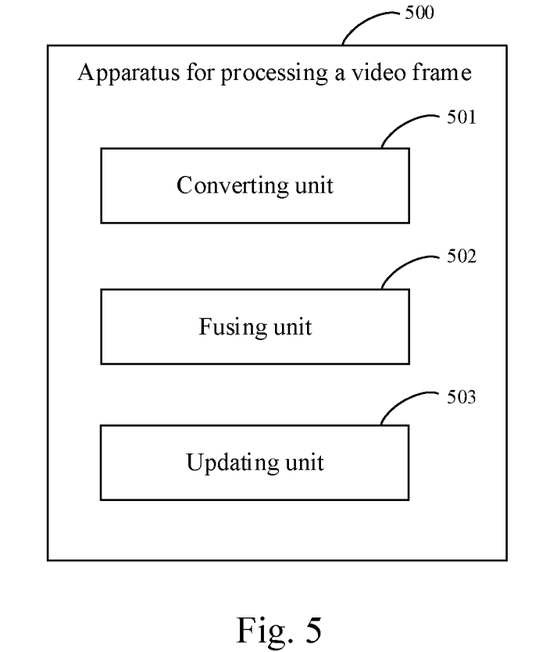
FIG. 5 is a schematic structural diagram of an apparatus for processing a video frame according to an embodiment of the present disclosure.

Further referring to FIG. 5, as an implementation of the method shown in the above figures, an embodiment of the present disclosure provides an apparatus for processing a video frame. The embodiment of the apparatus may correspond to the embodiment of the method shown in FIG. 2. Besides the features disclosed below, the embodiment of the apparatus may further include features or effects identical to or corresponding to the embodiment of the method shown in FIG. 2. The apparatus may be specifically applied to various electronic devices.

As shown in FIG. 5, the apparatus 500 for processing a video frame of the present embodiment includes: a converting unit 501, a fusing unit 502, and an updating unit 503. The converting unit 501 is configured to convert, using an optical flow generated based on a previous frame and a next frame of adjacent frames in a video, a feature map of the previous frame to obtain a converted feature map; the fusing unit 502 is configured to determine, based on an error of the optical flow, a weight of the converted feature map, and obtain a fused feature map based on a weighted result of a feature of the converted feature map and a feature of a feature map of the next frame; and the updating unit 503 is configured to update the feature map of the next frame, the updated feature map being the fused feature map.

The related description of step 201, step 202, and step 203 in the corresponding embodiment of FIG. 2 may be referred to for specific processing of the converting unit 501, the fusing unit 502, and the updating unit 503 of the apparatus 500 for processing a video frame and the technical effects thereof in the present embodiment, respectively. The description will not be repeated here.

In some alternative implementations of the present embodiment, the optical flow is a dense optical flow; and the apparatus further includes: an optical flow generating unit configured to contract the previous frame to a size of the feature map of the previous frame, contract the next frame to a size of the feature map of the next frame, determine a dense optical flow between the contracted previous frame and the contracted next frame, and use the dense optical flow as the optical flow generated based on the previous frame and the next frame of the adjacent frames in the video.

In some alternative implementations of the present embodiment, the fusing unit is further configured to determine the weight of the converted feature map based on the error of the optical flow by: converting the contracted previous frame using the dense optical flow to obtain a converted previous frame; determining, based on a difference between a pixel value of a pixel at each coordinate in the converted previous frame and a pixel value of the pixel at the coordinate in the contracted next frame, the error of the dense optical flow of the pixel at the coordinate; determining, for a pixel at the coordinate of an image obtained by converting a specified image using the dense optical flow, whether there is a pixel including a same object in the specified image, to obtain a determination result, where a size of the specified image is a target size; and determining a weight of the pixel at the coordinate in the converted feature map based on the error of the dense optical flow and the determination result.

In some alternative implementations of the present embodiment, the fusing unit is further configured to determine, for the pixel at the coordinate of the image obtained by converting the specified image using the dense optical flow, whether there is the pixel including the same object in the specified image, to obtain the determination result, where the size of the specified image is the target size, by: acquiring the specified image with a pixel value of each pixel being a preset pixel value; converting the specified image using the dense optical flow to obtain a converted specified image; determining, for the pixel at each coordinate in the converted specified image, whether a pixel value of the pixel at the coordinate in the converted specified image is greater than or equal to the preset pixel value; determining, in response to the pixel value of the pixel at the coordinate in the converted specified image being greater than or equal to the preset pixel value, the determination result being that there is the pixel including the same object in the specified image; and determining, in response to the pixel value of the pixel at the coordinate in the converted specified image being less than the preset pixel value, the determination result being that there is no pixel including the same object in the specified image.

In some alternative implementations of the present embodiment, the fusing unit is further configured to determine the weight of the pixel at the coordinate in the converted feature map based on the error of the dense optical flow and the determination result by: determining, in response to determining that the error of the dense optical flow is less than a specified error threshold, and the determination result is that there is the pixel including the same object in the specified image, that the weight of the pixel at the coordinate in the converted feature map is a first candidate weight, where the greater the pixel value of the pixel at the coordinate in the contracted next frame is, the higher the specified error threshold is; and determining, in response to determining that the error of the dense optical flow is more than or equal to the specified error threshold, and/or the determination result is that there is no pixel including the same object in the specified image, that the weight of the pixel at the coordinate in the converted feature map is a second candidate weight, where the first candidate weight is higher than the second candidate weight.

In some alternative implementations of the present embodiment, the apparatus further includes: weighting the feature of the converted feature map and the feature of the feature map of the next frame based on the weight of the converted feature map and a weight of the feature map of the next frame, to obtain the weighted result of the feature of the converted feature map and the feature of the feature map of the next frame, where the higher the weight of the converted feature map is, the lower the weight of the feature map of the next frame is.

In some alternative implementations of the present embodiment, the apparatus further includes: a feature generating unit configured to generate the feature map of the next frame and the feature map of the previous frame of the video using a generative adversarial network; and the apparatus further includes: a target generating unit configured to process the updated feature map using the generative adversarial network, to generate an image of a target domain corresponding to the next frame.

According to an embodiment of the present disclosure, an embodiment of the present disclosure further provides an electronic device and a readable storage medium.

Figure 6:
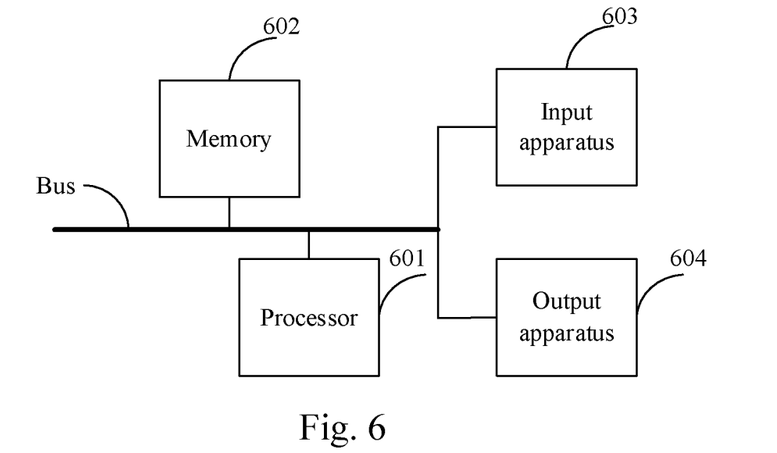
FIG. 6 is a block diagram of an electronic device for implementing the method for processing a video frame of embodiments of the present disclosure.

As shown in FIG. 6, a block diagram of an electronic device for implementing the method for processing a video frame according to embodiments of the present disclosure is shown. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 6, the electronic device includes: one or more processors 601, a memory 602, and interfaces for connecting various components, including a high-speed interface and a low-speed interface. The various components are interconnected using different buses, and may be mounted on a common motherboard or in other manners as required. The processor can process instructions for execution within the electronic device, including instructions stored in the memory or on the memory to display graphical information for a GUI on an external input/output apparatus (e.g., a display device coupled to an interface). In other embodiments, a plurality of processors and/or a plurality of buses may be used, as appropriate, along with a plurality of memories. Similarly, a plurality of electronic devices may be connected, with each device providing portions of necessary operations (e.g., as a server array, a group of blade servers, or a multi-processor system). In FIG. 6, a processor 601 is taken as an example.

The memory 602 is a non-transitory computer readable storage medium provided in embodiments of the present disclosure. The memory stores instructions executable by at least one processor, such that the at least one processor executes the method for processing a video frame provided in embodiments of the present disclosure. The non-transitory computer readable storage medium of embodiments of the present disclosure stores computer instructions. The computer instructions are used for causing a computer to execute the method for processing a video frame provided in embodiments of the present disclosure.

As a non-transitory computer readable storage medium, the memory 602 may be configured to store non-transitory software programs, non-transitory computer-executable programs, and modules, e.g., the program instructions/modules (e.g., the converting unit 501, the fusing unit 502, and the updating unit 503 shown in FIG. 5) corresponding to the method for processing a video frame in some embodiments of the present disclosure. The processor 601 runs non-transitory software programs, instructions, and modules stored in the memory 602, to execute various function applications and data processing of a server, i.e., implementing the method for processing a video frame in the above embodiments of the method.

The memory 602 may include a program storage area and a data storage area, where the program storage area may store an operating system and an application program required by at least one function; and the data storage area may store, e.g., data created based on use of the electronic device for processing a video frame. In addition, the memory 602 may include a high-speed random-access memory, and may further include a non-transitory memory, such as at least one magnetic disk storage component, a flash memory component, or other non-transitory solid state storage components. In some embodiments, the memory 602 alternatively includes memories disposed remotely relative to the processor 601, and these remote memories may be connected to the electronic device for processing a video frame via a network. Examples of the above network include, but are not limited to, the Internet, an intranet, a local area network, a mobile communication network, and a combination thereof.

The electronic device of the method for processing a video frame may further include: an input apparatus 603 and an output apparatus 604. The processor 601, the memory 602, the input apparatus 603, and the output apparatus 604 may be connected through a bus or in other manners. Bus connection is taken as an example in FIG. 6.

The input apparatus 603 may receive input digital or character information, and generate key signal inputs related to user settings and function control of the electronic device for tracking a target, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the Internet.

The computer system may include a client and a server. The client and the server are generally remote from each other and typically interact through the communication network. The relationship between the client and the server is generated through computer programs running on the respective computer and having a client-server relationship to each other.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by software, or may be implemented by hardware. The described units may also be provided in a processor, for example, described as: a processor, including a converting unit, a fusing unit, and an updating unit. The names of the units do not constitute a limitation to such units themselves in some cases. For example, the updating unit may be further described as "a unit configured to update a feature map of a next frame."

In another aspect, an embodiment of the present disclosure further provides a computer readable medium. The computer readable medium may be included in the apparatus described in the above embodiments, or a stand-alone computer readable medium without being assembled into the apparatus. The computer readable medium carries one or more programs. The one or more programs, when executed by the apparatus, cause the apparatus to: convert, using an optical flow generated based on a previous frame and a next frame of adjacent frames in a video, a feature map of the previous frame to obtain a converted feature map; determine, based on an error of the optical flow, a weight of the converted feature map, and obtain a fused feature map based on a weighted result of a feature of the converted feature map and a feature of a feature map of the next frame; and update the feature map of the next frame, the updated feature map being the fused feature map.

The above description only provides an explanation of embodiments of the present disclosure and the technical principles used. It should be appreciated by those skilled in the art that the inventive scope of embodiments of the present disclosure is not limited to the technical solutions formed by the particular combinations of the above-described technical features. The inventive scope should also cover other technical solutions formed by any combinations of the above-described technical features or equivalent features thereof without departing from the concept of embodiments of the present disclosure. Technical schemes formed by the above-described features being interchanged with, but not limited to, technical features with similar functions disclosed in embodiments of the present disclosure are examples.

What is claimed is:

1. A method for processing a video frame, comprising:
   converting, using an optical flow generated based on a previous frame and a next frame of adjacent frames in a video, a feature map of the previous frame to obtain a converted feature map;
   determining, based on an error of the optical flow, a weight of the converted feature map, and obtaining a fused feature map based on a weighted result of a feature of the converted feature map and a feature of a feature map of the next frame; and
   updating the feature map of the next frame to obtain an updated feature map, the updated feature map being the fused feature map,
   wherein the optical flow is a dense optical flow; and the method further comprises:
   contracting the previous frame to a size of the feature map of the previous frame to obtain a contracted previous frame; contracting the next frame to a size of the feature map of the next frame to obtain a contracted next frame; determining a dense optical flow between the contracted previous frame and the contracted next frame; and using the dense optical flow as the optical flow generated based on the previous frame and the next frame of the adjacent frames in the video.

2. The method according to claim 1, wherein the determining, based on the error of the optical flow, the weight of the converted feature map comprises:
   converting the contracted previous frame using the dense optical flow to obtain a converted previous frame;
   determining, based on a difference between a pixel value of a pixel at each coordinate in the converted previous frame and a pixel value of the pixel at the coordinate in the contracted next frame, the error of the dense optical flow of the pixel at the coordinate;
   determining, for a pixel at the coordinate of an image obtained by converting a specified image using the dense optical flow, whether there is a pixel including a same object in the specified image, to obtain a determination result, wherein a size of the specified image is a target size; and determining a weight of the pixel at the coordinate in the converted feature map based on the error of the dense optical flow and the determination result.

3. The method according to claim 2, wherein the determining, for the pixel at the coordinate of the image obtained by converting the specified image using the dense optical flow, whether there is the pixel including the same object in the specified image, to obtain the determination result, wherein the size of the specified image is the target size comprises:

acquiring the specified image with a pixel value of each pixel being a preset pixel value;

converting the specified image using the dense optical flow to obtain a converted specified image;

determining, for the pixel at each coordinate in the converted specified image, whether a pixel value of the pixel at the coordinate in the converted specified image is greater than or equal to the preset pixel value;

determining, in response to the pixel value of the pixel at the coordinate in the converted specified image being greater than or equal to the preset pixel value, the determination result being that there is the pixel including the same object in the specified image; and determining, in response to the pixel value of the pixel at the coordinate in the converted specified image being less than the preset pixel value, the determination result being that there is no pixel including the same object in the specified image.

4. The method according to claim 2, wherein the determining the weight of the pixel at the coordinate in the converted feature map based on the error of the dense optical flow and the determination result comprises:

determining, in response to determining that the error of the dense optical flow is less than a specified error threshold, and the determination result is that there is the pixel including the same object in the specified image, that the weight of the pixel at the coordinate in the converted feature map is a first candidate weight, wherein the greater the pixel value of the pixel at the coordinate in the contracted next frame is, the higher the specified error threshold is; and determining, in response to determining that the error of the dense optical flow is more than or equal to the specified error threshold, and/or the determination result is that there is no pixel including the same object in the specified image, that the weight of the pixel at the coordinate in the converted feature map is a second candidate weight, wherein the first candidate weight is higher than the second candidate weight.

5. The method according to claim 1, wherein the method further comprises:

weighting the feature of the converted feature map and the feature of the feature map of the next frame based on the weight of the converted feature map and a weight of the feature map of the next frame to obtain the weighted result of the feature of the converted feature map and the feature of the feature map of the next frame, wherein the higher the weight of the converted feature map is, the lower the weight of the feature map of the next frame is.

6. The method according to claim 1, wherein the method further comprises:

generating the feature map of the next frame and the feature map of the previous frame of the video using a generative adversarial network; and the method further comprises:

processing the updated feature map using the generative adversarial network, to generate an image of a target domain corresponding to the next frame.

7. An electronic device, comprising:

one or more processors; and a storage apparatus for storing one or more programs, the one or more programs, when executed by the one or more processors, causing the one or more processors to perform operations comprising:

converting, using an optical flow generated based on a previous frame and a next frame of adjacent frames in a video, a feature map of the previous frame to obtain a converted feature map;

determining, based on an error of the optical flow, a weight of the converted feature map, and obtaining a fused feature map based on a weighted result of a feature of the converted feature map and a feature of a feature map of the next frame; and updating the feature map of the next frame to obtain an updated feature map, the updated feature map being the fused feature map, wherein the optical flow is a dense optical flow; and the operations further comprise:

contracting the previous frame to a size of the feature map of the previous frame to obtain a contracted previous frame; contracting the next frame to a size of the feature map of the next frame to obtain a contracted next frame; determining a dense optical flow between the contracted previous frame and the contracted next frame; and using the dense optical flow as the optical flow generated based on the previous frame and the next frame of the adjacent frames in the video.

8. The electronic device according to claim 7, wherein the determining, based on the error of the optical flow, the weight of the converted feature map comprises:

converting the contracted previous frame using the dense optical flow to obtain a converted previous frame;

determining, based on a difference between a pixel value of a pixel at each coordinate in the converted previous frame and a pixel value of the pixel at the coordinate in the contracted next frame, the error of the dense optical flow of the pixel at the coordinate;

determining, for a pixel at the coordinate of an image obtained by converting a specified image using the dense optical flow, whether there is a pixel including a same object in the specified image, to obtain a determination result, wherein a size of the specified image is a target size; and determining a weight of the pixel at the coordinate in the converted feature map based on the error of the dense optical flow and the determination result.

9. The electronic device according to claim 8, wherein the determining, for the pixel at the coordinate of the image obtained by converting the specified image using the dense optical flow, whether there is the pixel including the same object in the specified image, to obtain the determination result, wherein the size of the specified image is the target size comprises:

acquiring the specified image with a pixel value of each pixel being a preset pixel value;

converting the specified image using the dense optical flow to obtain a converted specified image;

determining, for the pixel at each coordinate in the converted specified image, whether a pixel value of the pixel at the coordinate in the converted specified image is greater than or equal to the preset pixel value;

determining, in response to the pixel value of the pixel at the coordinate in the converted specified image being greater than or equal to the preset pixel value, the determination result being that there is the pixel including the same object in the specified image; and determining, in response to the pixel value of the pixel at the coordinate in the converted specified image being less than the preset pixel value, the determination result being that there is no pixel including the same object in the specified image.

10. The electronic device according to claim 8, wherein the determining the weight of the pixel at the coordinate in the converted feature map based on the error of the dense optical flow and the determination result comprises:

determining, in response to determining that the error of the dense optical flow is less than a specified error threshold, and the determination result is that there is the pixel including the same object in the specified image, that the weight of the pixel at the coordinate in the converted feature map is a first candidate weight, wherein the greater the pixel value of the pixel at the coordinate in the contracted next frame is, the higher the specified error threshold is; and determining, in response to determining that the error of the dense optical flow is more than or equal to the specified error threshold, and/or the determination result is that there is no pixel including the same object in the specified image, that the weight of the pixel at the coordinate in the converted feature map is a second candidate weight, wherein the first candidate weight is higher than the second candidate weight.

11. The electronic device according to claim 7, wherein the operations further comprise:

weighting the feature of the converted feature map and the feature of the feature map of the next frame based on the weight of the converted feature map and a weight of the feature map of the next frame to obtain the weighted result of the feature of the converted feature map and the feature of the feature map of the next frame, wherein the higher the weight of the converted feature map is, the lower the weight of the feature map of the next frame is.

12. The electronic device according to claim 7, wherein the operations further comprise:

generating the feature map of the next frame and the feature map of the previous frame of the video using a generative adversarial network; and the operations further comprise:

processing the updated feature map using the generative adversarial network, to generate an image of a target domain corresponding to the next frame.

13. A non-transitory computer readable storage medium, storing a computer program thereon, the computer program, when executed by a processor, causing the processor to perform operations comprising:

converting, using an optical flow generated based on a previous frame and a next frame of adjacent frames in a video, a feature map of the previous frame to obtain a converted feature map;

determining, based on an error of the optical flow, a weight of the converted feature map, and obtaining a fused feature map based on a weighted result of a feature of the converted feature map and a feature of a feature map of the next frame; and updating the feature map of the next frame, the updated feature map being the fused feature map, wherein the optical flow is a dense optical flow; and the operations further comprise:

contracting the previous frame to a size of the feature map of the previous frame to obtain a contracted previous frame; contracting the next frame to a size of the feature map of the next frame to obtain a contracted next frame; determining a dense optical flow between the contracted previous frame and the contracted next frame; and using the dense optical flow as the optical flow generated based on the previous frame and the next frame of the adjacent frames in the video.

* * * * *